INVENTOR.
EUGENE C. UHRENHOLDT

BY
Glenn, Palmer & Matthews
attorneys

INVENTOR.
EUGENE C. UHRENHOLDT
BY Glenn, Palmer & Matthews
attorneys

INVENTOR
EUGENE C. UHRENHOLDT
BY Glenn, Palmer & Matthews
attorneys

VOLTAGE CONTROL IN ALUMINUM ELECTROLYSIS CELLS DURING FLEX-RAISE PERIOD

Original Filed April 29, 1965 5 Sheets-Sheet 4

INVENTOR
EUGENE C. UHRENHOLDT
BY Glenn, Palmer & Matthews
Attorneys

INVENTOR.
EUGENE C. UHRENHOLDT
BY Glenn, Palmer & Matthews
Attorneys 3,485,727
Patented Dec. 23, 1969

3,485,727

VOLTAGE CONTROL IN ALUMINUM ELECTROLYSIS CELLS DURING FLEX-RAISE PERIOD

Eugene Clifford Uhrenholdt, Henrico County, Va., assignor to Reynolds Metals Company, Richmond, Va., a corporation of Delaware Continuation of application Ser. No. 451,782, Apr. 29, 1965. This application July 17, 1968, Ser. No. 749,247
Int. Cl. C22d 3/12
U.S. Cl. 204—67 21 Claims

ABSTRACT OF THE DISCLOSURE

Method and circuit for controlling the working voltage of a single or plurality of reduction pots during the flex-raise or reduction cycle. A reference signal is generated, which is proportional to the total pot voltage. The reference signal is null balanced against a standard signal. Imbalance between the two signals, produced by bath alumina content variations, generates a difference signal which operates, within determined ranges, to cause anode distance adjustment. The reference voltage may be continuously varied in response to anode voltage variations or other desired variables, through a program means. Control action is maintained sequentially and may be interrupted beyond certain limits.

This invention relates to a method of and apparatus for controlling reduction pots, and more particularly to a method of and apparatus for automatically controlling the working voltage of aluminum reduction pots in the process of electrolytic production of aluminum. This application is a streamlined continuation application of application Ser. No. 451,782, filed Apr. 29, 1965, and entitled Method and Apparatus for Controlling Reduction Pots, now abandoned, which is in turn a continuation-in-part of the inventor's copending application Ser. No. 305,597, filed Aug. 30, 1963 (now U.S. Patent 3,329,592) and entitled "Method of and Apparatus for Controlling Aluminum Reduction Pots."

In the conventional electrolysis of alumina dissolved in a molten salt electrolyte such as cryolite, the alumina is broken down in a cell or pot having an anode and cathode and deposited at the cathode by passing a very large current of thousands of amperes between the anode and cathode. Typically the total pot voltage $V_P$ is in the order of 4.5–5 volts while the working voltage $V_W$ (voltage between anode face and cathode) is in the order of 3.5–4 volts. The working voltage $V_W$ is subject to variation due to changes within the pot such as variation in alumina concentration, resistance, line current, anode voltage, cathode voltage, and other factors making it difficult to measure directly with accuracy. A stable working voltage $V_W$ is essential in order to maintain a substantially constant thermal balance of the pot and it is recognized that a constant working voltage is essential for efficient and economical pot operation.

The problem of controlling reduction working voltage in producing aluminum has long been of great concern in the industry and generally is achieved by varying the distance between the anode and cathode of the aluminum reduction pot in order to compensate for fluctuations in the working voltage caused by variation in bath alumina concentrations. However, this control function has in the past been effected manually by a skilled operator and, of course, subject to human limitations. Although voltage comparison techniques where the pot voltage is compared with a standard voltage and the anode adjusted relative to the cathode in order to seek a null balance are known, this method of control is in many ways more harmful than helpful because of the continuous cycling or hunting in such systems. Due to the numerous factors that may continuously induce or cause minor fluctuations in the working voltage, present voltage comparison anode positioner systems are in constant operation resulting in continuous cycling and anode adjustment and in many cases completely upsetting the thermal balance of the pot.

Further, known voltage comparison systems for maintaining a stable working voltage cannot be adapted to automatically control a large number or reduction cells or pots as the resulting complex circuitry and apparatus is not only prohibitive costwise, but is also highly inaccurate and does not provide the necessary control required for automatically regulating a number of pots.

A principal reason why known voltage comparison systems have not been arranged to control a plurality of cells is that each reduction pot may have a different optimum working voltage due to its particular line resistance, ledge formations, and other individual characteristics, and until now it has not been known in the industry how to automatically maintain a series of different pots at their respective optimum working voltage values using a comparison and balancing technique. For that matter, it is extremely difficult to maintain accurate control of one reduction cell using known voltage comparison balancing techniques because of the manner in which the working voltage is measured and compared with a standard voltage.

In the aforementioned copending continuation-in-part application methods of and apparatus for controlling a plurality of aluminum reduction pot voltage control systems are described in detail. In these systems the working voltage $V_W$ for each reduction pot is utilized to provide a reference voltage $V_R$ proportional to the optimum working voltage $V_W$ for each pot. By means of a voltage divider the reference voltage $V_R$ may be adjusted to within a determined control range of a single standard voltage $V_S$. Thereafter and during the reduction or flex-raise cycle the voltages $V_R$ are sequentially compared with the standard voltage $V_S$ and the anode to cathode spacing adjusted to maintain each working voltage $V_W$ within a determined control range.

In the copending continuation-in-part application the working voltage is measured directly by inserting a probe through the anode into the baked area of the carbons and the cathode voltage $V_C$ is assumed to be substantially constant in effecting control of the working voltage. By measuring the working voltage directly with the probe variations in $V_A$ are largely eliminated, although any variations of $V_C$ and $V_A$ are reflected as an apparent variation in $V_W$ and thus may call for a control response. A disadvantage of the invention described in the copending continuation-in-part application is the difficulty in measuring the working voltage utilizing the probe technique. The total pot voltage $V_p$ (which includes $V_W$ as well as the other variables) however can be more easily measured.

There may also be variations in the reversible decomposition voltage $V_D$ and the polarization voltage $V_{pc}$ for instance, also assumed as being substantially constant in the control systems in the copending applications and any change in any one or more of these parameters may improperly cause an apparent variation in working voltage $V_W$. Thus variation of the anode-cathode distance may be effected in response to a variation in anode voltage $V_A$, rather than confining it to the effects of variation in bath alumina concentration percent $Al_2O_3$ during the flex-raise or reduction cycle.

In the copending continuation-in-part application the working voltage $V_W$ is measured directly by using an anode probe, in order to reduce the significance of variation of the anode voltage $V_A$. However, even with the available measurement probes, it is difficult to measure the working voltage $V_W$ (voltage between anode face and cathode face) without including some variation in the anode voltage $V_A$ and cathode voltage $V_C$, necessitating a predetermined program of compensation for variations in the respective parameters governing the operation of each reduction pot. The flex-raise period of a conventional side pin Soderberg cell may be a period of several days—typically 15 days. During this flex-raise period reduction of alumina is generally continuous and there is a constant decrease of bath alumina between alumina additions at typically 4-hour intervals requiring periodic adjustment (decreases) of the anode to cathode distance when using the voltage control system of the copending application as well as in this invention.

Over the flex-raise period, the anode voltage $V_A$, which is substantially an ohmic resistance, can be as high as 0.7–1.0 volt immediately after a flex-raise (anodes raised) and gradually decreases to about 0.4 volt during reduction before the next flex-raise. Generally variation in the anode voltage $V_A$ is caused by a decreasing length of current path as the anode burns off during reduction and by the improved electrical conductivity as the carbon becomes more completely baked. In the control system of the copending application the working voltage $V_W$ measured is an approximation and is still effected a reduced amount by variation in the anode voltage $V_A$.

Accordingly, an object of this invention is to provide a method of and apparatus for producing a reference signal, proportional to the total pot voltage $V_p$ and including the optimum working voltage $V_W$ of an aluminum reduction pot and including program means for compensating for variations in one or more variables effecting said total pot voltage $V_p$ whereby only variables effecting said working voltage $V_W$ are reflected a resultant said reference signal.

Still another object of this invention is to provide a method of and apparatus for controlling the working voltage $V_W$ of an aluminum reduction pot utilizing the total pot voltage $V_p$ in response to variations in the bath alumina content of said pot by adjusting the anode-cathode distance of said pot in response to variations in said bath alumina content and said working voltage $V_W$ wherein a resultant reference signal is compared with a standard signal and any difference therebetween utilized to vary said anode-cathode distance and including program means for adjusting said reference signal in response to any variations in said total pot voltage $V_p$ independently of variations in said working voltage $V_W$ included in said total pot voltage $V_p$.

A further object of this invention is to provide a method of and apparatus for controlling the working voltage $V_W$ of a plurality of reduction pots each having an anode and a cathode wherein reference signals proportional to the total pot voltage $V_p$ for each pot, each resultant reference signal being equal to a single standard signal and compared with said single standard signal in seriation, any difference signal between said reference and standard signals employed to vary the anode-cathode distance of each of said pots respectively and including program means for varying said reference signal in response to variations in variables other than alumina concentrations effecting said total pot voltage $V_p$ for each of said pots.

Another object of this invention is to provide a method of and apparatus for controlling the working voltage $V_W$ of a plurality of aluminum reduction pots by regulating the total pot voltage $V_p$ wherein a plurality of equal reference signals proportional to the total pot voltage $V_p$ and including an optimum working voltage $V_W$ for each reduction pot is generated, said reference signal for each pot including a variable anode voltage, said reference signals being continuously varied in response to variations in said anode voltage and the resultant reference signal being sequentially compared for determined intervals with a single standard signal, and wherein a control function is initiated only when the difference signal between said respective resultant reference and standard signals exceeds a predetermined minimum amount and wherein said sequential comparisons are interrupted when said difference signal exceeds a determined maximum.

These and many other objects may be obtained by practicing the method in accordance with this invention which in general may include the steps of first producing a reference signal ($V_R$) proportional to the total pot voltage $V_p$ of an aluminum reduction pot, and equal to a standard signal $V_S$ at which time a null balance is obtained.

As the pot voltage $V_p$ (which also includes a variable anode voltage $V_A$) and thus $V_R$ vary in response to variations in bath alumina and the difference signal $$(V_R - V_S = V_D)$$

exceeds a minimum value, valve means adjust the anode-cathode distance until the difference signal $V_D$ is again within the determined control range. Program means are provided for continuously varying the reference voltage $V_R$ in response to variations in the anode voltage $V_A$ and other variables as desired.

When controlling the working voltage $V_W$ of a plurality of reduction pots by regulating the pot voltage $V_p$, a plurality of reference signals $V_R$ are provided that are proportional to the total pot voltage $V_p$ which includes $V_W$ as in the case of controlling a single reduction pot. Although the optimum working voltage $V_W$ for each reduction pot may be different, by producing a reference signal $V_R$ proportional to the respective pot voltage $V_p$ and thus the working voltage $V_W$, all reference signals $V_R$ may be brought within specific limits of a predetermined value and thus only a single standard signal $V_S$ is required.

The reference signal $V_R$ from each reduction pot is continuously varied in response to variations in the anode voltage $V_A$ by program means and sequentially compared with the standard signal $V_S$ providing a difference signal $V_D$ which varies in response to variations in the working voltage $V_W$. When the difference signal $V_D$ exceeds the control range value the anode-cathode distance for the respective reduction pot is adjusted until $V_D$ is again within the control range. If $V_D$ exceeds a maximum value, the sequential comparison steps are interrupted and control action is not effected. If no control action is effected within a determined interval upon first comparison, the next reference signal is compared to the standard signal, and so on in sequence. If control action is effected and not completed within a determined interval which is variable up to a maximum time period, the next comparison is made.

Apparatus in accordance with the invention for accomplishing the aforementioned and many other objects may include a conventional reduction pot and a suitable source of current for effecting electrolytic reduction; a standard signal $V_S$; and means for impressing the pot voltage $V_p$ between a relatively adjustable anode and cathode of a reduction cell across a variable impedance. Programmed means comprising a cam surface corresponding to the variation of the anode voltage $V_A$ and other variables in the pot voltage $V_p$ except the working voltage $V_W$ over the flex-raise period are arranged to adjust the variable impedance whereby only variations in working voltage $V_W$ due to variations in bath alumina are reflected in the reference signal $V_R$. Scanning means are provided for sequentially comparing a portion $V_R$ of the voltage $V_p$ across each variable impedance, with the standard signal $V_S$ to produce a difference signal $V_D$ proportional to variations in said working voltage $V_W$.

Means responsive to said difference signal $V_D$ adjust said anode-cathode distance to maintain the difference signal $V_D$ within a determined control range.

Timing means control each comparison step providing a minimum delay time whereby the scanning means proceeds to the next reference signal $V_R$ if no control action is effected. However, if control action is effected but not completed during the minimum time interval, the control period is repeated until the control action is completed and the difference signal $V_D$ brought within the control range. The scanning means are also provided with manual and reset control features.

Although the invention has been described as relating to the control of aluminum reduction pots, it is not intended to be limited thereto as the invention may be used in other instances where it is desired to compare and balance a variable signal with a standard signal, particularly where it is desirable to compare and balance a series of variable signals with a single standard signal. Further, the program means may be employed to comensate for all determinable normal variations within a reduction pot effecting the pot voltage except variations in a desired control parameter—in this instance bath alumina. By incorporating a predetermined program in this manner, the reduction cycle can be completed without disturbing the principal control function.

The noted objects and advantages of the invention as well as numerous others will become apparent from the following detailed description when read in view of the appended drawings wherein:

FIGURES 1*a*–1*e* illustrate curves of various variable parameters of an aluminum reduction pot in which variation of total pot voltage $V_p$ and pot working voltage $V_W$ are permitted;

FIGURES 2*a*–2*e* illustrate curves of the same variable parameters of an aluminum reduction pot as shown in FIGURE 1 in which the total pot voltage $V_p$ and working voltage $V_W$ are regulated and maintained substantially constant;

A primary object of the invention is to automatically control the working voltage $V_W$ (voltage between the anode face and the cathode) of one or more aluminum reduction pots. Whether pot control is manual or automatic, the problems involved are formidable and involve a large number of variables such as pot adjustment, breaking of crust, tapping of molten aluminum, the addition of alumina, bath materials and other operations.

A constant goal is maximum production of aluminum at minimum cost. Experience indicates a governing factor of efficient pot operation is thermal balance, which requires control of the power input to the pot. As the line current remains essentially constant, variation in the working voltage $V_W$ is a critical factor. This is clearly illustrated by FIGURES 1*a*–1*e* which show various operational curves of an unregulated, thermally unbalanced pot having a variable pot voltage $V_p$ resulting from a variable working voltage $V_W$ and a regulated, thermally balanced pot (FIGURES 2*a*–2*e*) having a constant pot voltage $V_p$ and consequently a stable working voltage $V_W$.

FIGURES 2*a*–2*e* clearly show how little the heat input to the regulated pot varies when the pot voltage $V_p$ is kept constant by varying the anode-cathode distance to offset the decrease in alumina concentration. Compare this with the large increase in heat input in the unregulated pot as shown in FIGURES 1*a*–1*e*, and again caused by variations in alumina concentration.

Figure 1D:
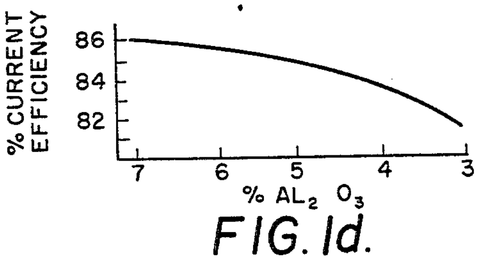
Figure 2D:
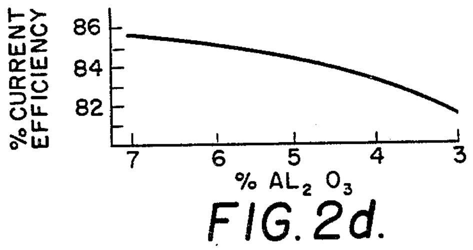
Figure 1E:
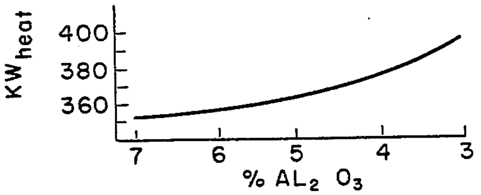
Figure 2E:
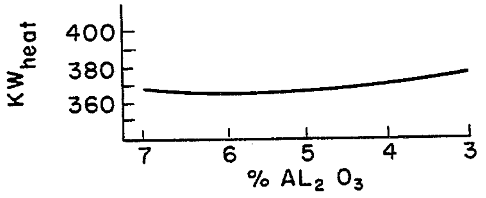

The net effect of decreasing alumina concentration is to increase the pot voltage $V_p$ as long as the anode-cathode distance remains constant. As the power (KW) input increases, the pot heats up and current efficiency decreases as shown in FIGURE 1*d*. As less power is used to make aluminum, the remainder is converted to heat, causing the rise in heat input, FIGURE 1*c*.

Figure 1A:
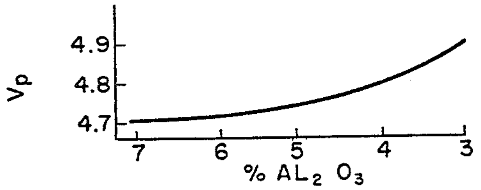
Figure 2A:
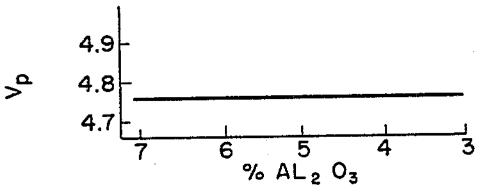
Figure 1B:
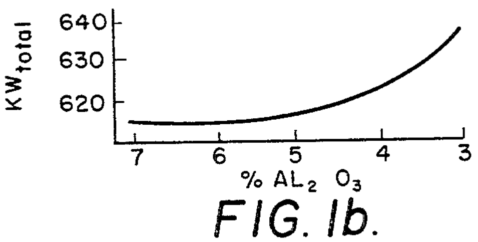
Figure 2B:
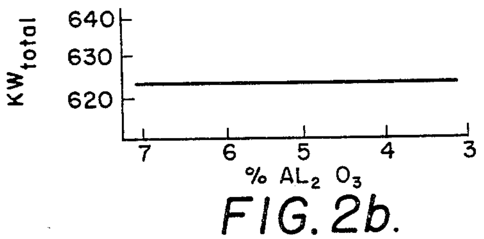
Figure 1C:
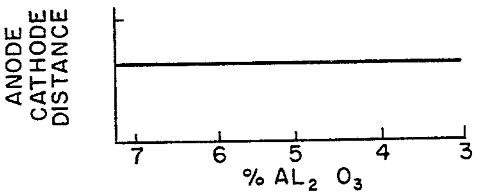
Figure 2C:
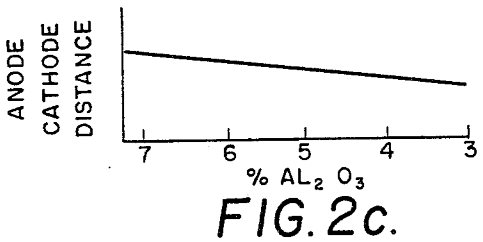

However, as shown in FIGURES 2*a*–2*e*, the power input KW remains substantially constant with a constant pot voltage $V_p$ maintained by shortening the anode-cathode distance (FIGURE 2*c*). Although current efficiency decreases (FIGURE 2*e*) as the anode-cathode distance decreases (FIGURE 2*c*), the heat input (FIGURE 2*e*) rises only slightly since there is less total KW input to the pot (FIGURE 2*a*). As will become apparent fluctuation or variation in $V_p$ results from variation in the working voltage $V_W$ between the anode face and cathode. $V_W$ is regulated, or maintained substantially constant, by varying the anode-cathode distance and thus $V_p$ is maintained substantially constant. The curves for both $V_p$ (FIGURES 1 and 2) and $V_W$ correspond.

The data for the curves shown in FIGURES 1 and 2 were computed as follows:

Curve *a*—Pot volts ($V_p$) vs. percent $Al_2O_3$ $$V_p = V_{ext} + V_W$$

where:

$V_p$=total pot voltage
$V_{ext} = V_A$(anode drop)$+V_C$(cathode drop)
$V_w$=bath voltage drop between anode face and cathode $$= I\frac{L}{A_b C} + V_{pc}$$

$L = a\text{-}c$=anode-cathode distance
C=bath conductivity
$A_b$=bath area $$V_{pc} = \text{polarized cell potential} = \frac{0.488\, I/A}{R(\text{percent } Al_2O_3)} + 1.62$$

I/A=current density
R=bath ratio

Curve *b*—Total pot KW vs. percent $Al_2O_3$ $$KW = IV_p = 132{,}000\ V_p$$

Curve *c*—Experimental results

Curve *d*—Percent current efficiency vs. percent $Al_2O_3$

Estimated from an equation of the form:

$$CE = A' + B'L + C'(KW)$$

where A′, B′, and C′ are constants.

This equation approximates the following:

$$CE = A' + B'L^{E'} + D'(KW)$$

Curve *e*—Heating vs. percent $Al_2O_3$ $$KW_{heat} = KW_{total} - KW_{al}$$

where $KW_{al}$=power to make aluminum from:

$$KW_{al} = IV_{al} = I[0.508 + 1.645(CE)]$$

computed from the stoichiometry and thermodynamics of the reaction.

It is important to note that for the purpose of this invention voltage control and thus the maintenance of a constant working voltage $V_W$ is achieved by regulating the total pot voltage $V_p$. As stated in the proof of curves 1 and 2, the working voltage $V_W$ is maintained at a substantially constant value by varying the anode-cathode distance of each reduction pot in response to variations in bath alumina concentration. In the voltage control system of the copending continuation-in-part application the working voltage $V_W$ is measured directly and control action is taken in response to variations in bath alumina to maintain the working voltage substantially constant. The working voltage $V_W$ however is more difficult to measure and use than the pot voltage $V_p$ and subject to some undesired variations due to changes in the anode voltage $V_A$.

Figures 3, 4:
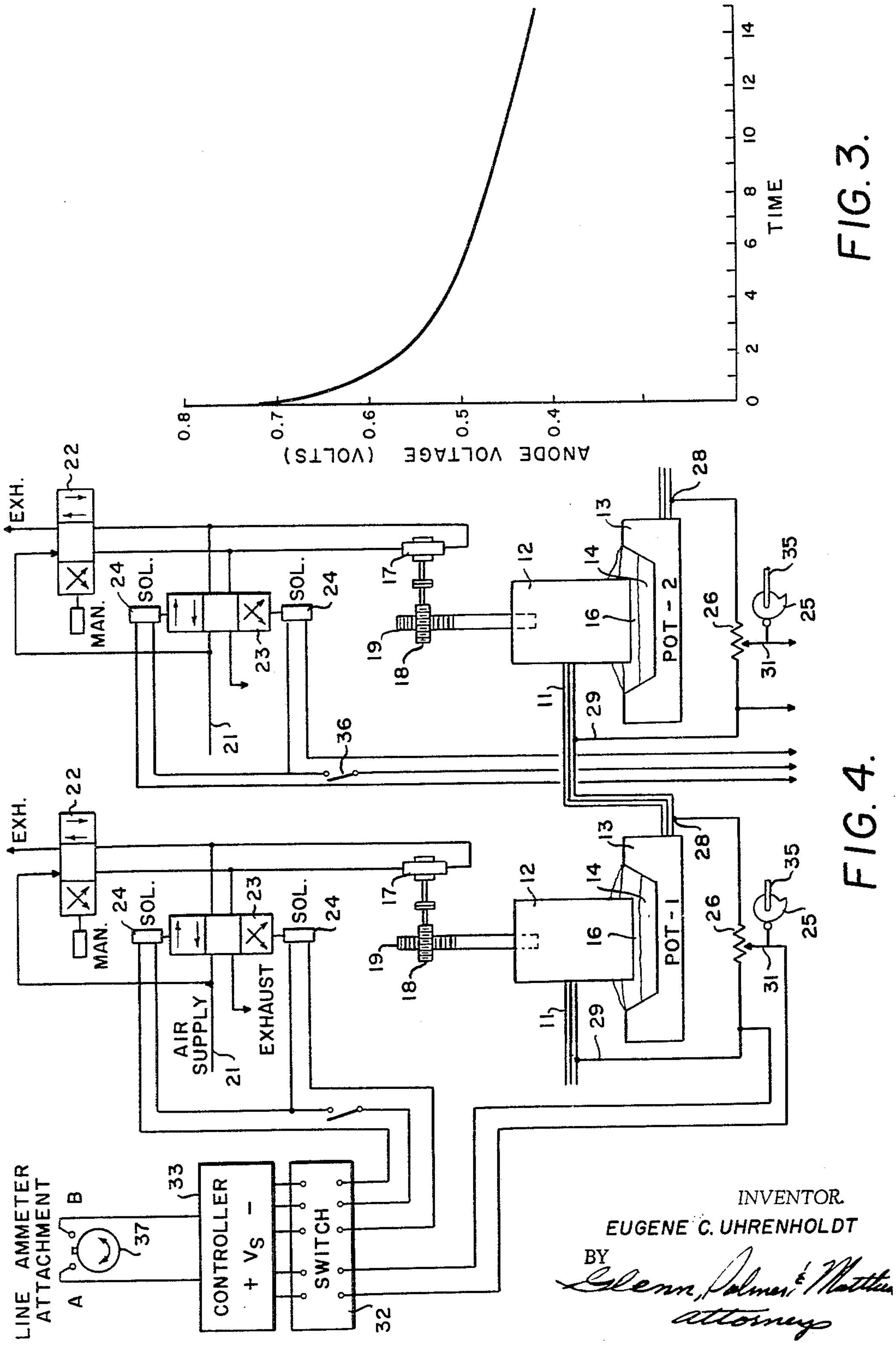
FIGURE 3 is a curve illustrating the variation in anode voltage $V_A$ during a flex raise period.
FIGURE 4 is a schematic diagram illustrating the invention as used for the control of a plurality of aluminum reduction pots.

It has been determined the anode voltage $V_A$ drop results from the pure ohmic resistance of the anode which varies operationally with the line current, flex-raise cycle, and the quality of anode baking. The anode voltage $V_A$ drop can be as high as 0.7–1.0 volt immediately after a flex-raise and gradually decreases to a minimum of about 0.4 volt, just before the next flex-raise. This fall in potential is caused by a decreasing length of current path as the anode burns off and by improved electrical conductivity in the carbon anode and is illustrated in FIGURE 3. Typically, there may be a 15-day period between flex-raise. $V_A$ increases sharply at the time of the flex-raise and gradually settles down to a substantially linear decrease during the later days of the flex-raise period. The cathode voltage $V_C$ is also the result of an ohmic loss which varies operationally with the line current, the age of the cathode, and the amount of ledging and muck in the pot. The variation of the cathode $V_C$ may be substantial and increases with the age of the pot. During periods of upset operation the bottom of the pot becomes mucky and heavily ledged and the cathode voltage $V_C$ may be well over 1.0 volt.

Both $V_A$ and $V_C$ may be different for each pot depending upon the age, size, flex-raise cycle and other characteristics of each pot and may be determined by repeated measurements during the flex-raise period and then empirically plotted in wave forms as shown in FIGURE 3. Thus each pot may have a similar but different anode voltage $V_A$ curve. Both variables $V_A$ and $V_C$ and other operational variables may be reproduced by generating a cam surface corresponding to one or both variables on a suitable cam and then continuously rotating the cam during the flex-raise cycle. By utilizing the cam to vary a variable impedance a reference voltage $V_R$ is produced that is unaffected by variations in $V_A$ and $V_C$ but responsive only to variation in alumina concentration—the desired control parameter. In the control system described in the aforementioned copending application $V_A$ and $V_C$ are assumed constant or approximated. However, variations in either $V_A$, $V_C$ or both can lead to apparent variations in $V_W$ and thus $V_R$ leading to erroneous control responses and continuous changes of *a-c* distance. It can be seen that by incorporating the predetermined cam program for the variables such as anode voltage $V_A$, cathode voltage $V_C$ and predictable variables control of the working voltage $V_W$ is then effected only in response to variations in a desired control parameter—in this instance variation in working voltage.

Referring now to FIGURE 4, a system for automatically controlling the working voltage $V_W$ of one or more aluminum reduction pots in accordance with the invention is illustrated. A series of aluminum reduction pots 1, 2, *n*, of conventional construction, are connected in series with a suitable power bus 11. Each pot includes a vertically adjustable anode 12, of either the self-baked (Soderberg) type or the pre-baked type, a cathode 13, a layer of molten aluminum 14, and bath components 16. Each adjustable anode 12 is raised up and down by means of a reversible air motor 17 that turns a screw 18 to reciprocate a jack 19 secured to the adjustable anode 12. The reversible air motors 17 are similarly connected to a suitable source of air pressure 21 by way of both a manual four-way air valve 22 and a four-way, three position air valve 23, operated by solenoids 24.

A variable resistance 26 is connected to the anode bus 11 and cathode bus 28. The anode bus 11 and cathode bus 28 connections are arranged to measure the voltage potential $V_p$ between the anode bus and the cathode bus and including $V_W$, $V_A$, and $V_C$ and other variables. The voltage across the variable resistance 26 is in parallel with and substantially the same as the voltage $V_p$ (Equation I). A center tap 31 is adjusted to provide a voltage $V_R$ of desired value and proportional to the voltage $V_p$ of the pot. Cams 25 having cam surfaces generated thereon corresponding to the predictable variation of $V_A$ for instance and other predictable variables such as $V_p$ and other pot variables effecting pot voltage for each of said respective pots, and mounted on suitable drive shafts 35, are driven by conventional constant speed motors and arranged to continuously vary the variable resistance 26 throughout the flex-raise for each reduction pot. The center tap 31 of each variable resistance is forced to continuously engage the cam by springs or other suitable means. Each cam 25 may be independently driven by separate motor or by means of a single motor and common drive shaft 35.

In operation each cam 25 moves the center tap 31 of each respective variable resistance 26 so as to correspondingly increase or decrease $V_R$ as $V_A$ and $V_C$ and other variables decrease or increase respectively during the flex-raise cycle so that only that variation in $V_W$ caused by changes in the bath alumina concentration are reflected in $V_R$ for each of the reduction pot. Initially, each cam 25 is set to produce the lowest resistance in each respective variable resistor 26 at the time of the flex-raise since this is the time the anode voltage $V_A$ is the highest. Rotations of the cam 25 will then raise the resistance of resistor 26 to correspond with the predictable variance of $V_A$ as shown in FIGURE 3. In this way a predetermined program for the entire flex-raise period of each pot is introduced into the control system to compensate for selected system variables without interfering with the desired control parameter—in this instance working voltage.

A multiple position, impulse actuated scanning switch 32 sequentially connects each variable resistance 26 and resulting signal $V_R$ to a single controller 33 including a standard voltage source $V_S$ which is compared with $V_R$ of each pot 1–N. If $V_D$ ($V_S - V_R$) exceeds a control range, the controller 33 is arranged to pulse either of the solenoids 24 by way of conductors 34 to raise or lower the anode 12 until the working voltage $V_W = V_R$ or within a determined tolerance. At this time, $V_D$ is again within the determined control range. A manual control switch 36 is provided for disconnecting both solenoids from the controller 33. A line ammeter switch attachment 37 is arranged to measure the current in bus 11 and disconnect the controller 33 if the line current varies more than a determined amount from a normal operating level. In this instance a 1,000 ampere line current fluctuation operates the attachment 37 to disconnect the controller 33 and automatic scanning is discontinued until the line current is again normal.

In operation, the switch 36 for each pot 1–N is opened and the respective anode 12 adjusted until the pot 1–N is operating at its optimum condition at which time there is a voltage drop $V_W$ across the variable resistor 26. The variable resistor 26 is adjusted until a reference voltage $V_R$ equal to a standard voltage $V_S$ is available across the center tap 31 and one terminal of the variable resistor. The center tap 31 is then brought into engagement with cam 25 so as to start the predetermined program described. The switch 13 is then closed and the pot is on line prepared for automatic voltage control. Each pot 1–N is similarly adjusted and the reference voltage $V_R$ from each variable resistor is made equal to the standard voltage $V_S$. Preferably automatic control is started near the end of the flex-raise cycle.

As all of the reference voltages $V_R$ are proportional to the pot voltage $V_p$ of each pot, this method of calibration compensates for any difference in $V_p$ for optimum conditions in each pot and also permits the use of a single standard voltage $V_S$ for comparison. In the event that adjustment of the pot voltage $V_p$ (or working voltage $V_W$) is required in order to maintain optimum operating conditions at a particular pot 1–N, the scanning switch 32 may be manually stepped to that pot position, switch 36 opened and manual adjustment of the anode-cathode distance effected as described. As adjustments are required infrequently the pot voltage $V_p$ of the pots under control are checked periodically at scheduled intervals. Adjustments are made to keep each pot operating at its optimum operating condition.

With each pot 1–N calibrated and on line, scanning of all pots 1–N under control is performed continuously. As each pot is monitored or scanned, the reference voltage $V_R$ is compared with the standard $V_S$ and if $V_R$ exceeds the set point $V_S$ by a determined amount, the proper solenoid 24 is energized to raise or lower the anode 12 until $V_R$ is again within the control or dead band around the set point $V_S$. For instance a 50 mv. dead band or control range may be employed so that $V_R$ is maintained within $\pm 25$ mv. of the set point $V_S$. The control or center dead band is adjustable. Timing means incorporated in the controller 33 delay control action momentarily to prevent continuous hunting or cycling that may be caused by brief fluctuations of $V_p$ and thus $V_R$ outside the control dead band.

In the event that $V_p$ and thus $V_R$ vary more than a determined maximum amount from the set point, $V_S$, for instance 0.2 volt, due to an anode effect or other disturbance, switch means (FIGURE 6) cut out the controller 33 and prevent any future scanning of that particular pot until the voltage condition is relieved. The pot in trouble may be removed from the line by opening the disconnect switch 36, and scanning of the remaining pots continues. A lower voltage limit of 1 volt, for instance, under set point $V_S$, prevents the anode from being raised with a zero voltage $V_R$ presented to the controller by the scanning switch 32.

Timing means (FIGURE 6) established a minimum scan time of any determined value of say 3 seconds, so that unless a control action is commenced during this interval the scanning switch 32 steps to the next position. In the event a control action is started but not completed during the minimum scan interval, the scan period is automatically extended equal time periods (FIGURE 6) until the control action is completed. If $V_p$ and thus $V_R$ are not properly restored in an arbitrary maximum time interval of say 30 seconds, a signal is provided and the scanning switch steps to the next position. All time intervals are variable as desired and as necessary. Also, in order to prevent too frequent scanning cycles and repeated anode adjustment as where only one or but a few pots are to be controlled, a cycle timer may be provided so that scanning is completed at determined intervals.

Figure 5:
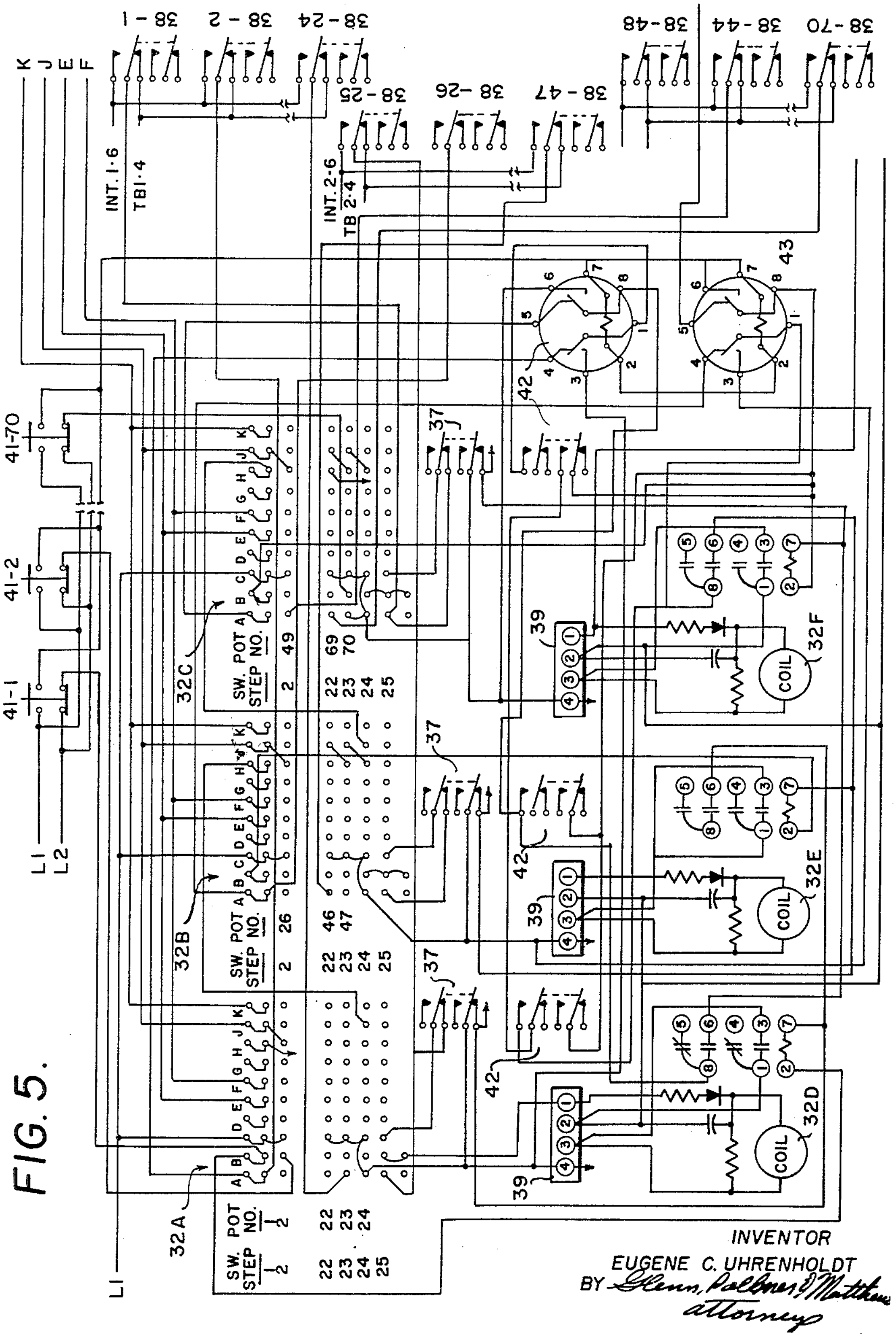
FIGURE 5 is an electrical schematic of a portion of the control circuit of the invention illustrating a plurality of interlocked stepping switches used to effect a scanning operation, in accordance with the invention.
Figure 6:
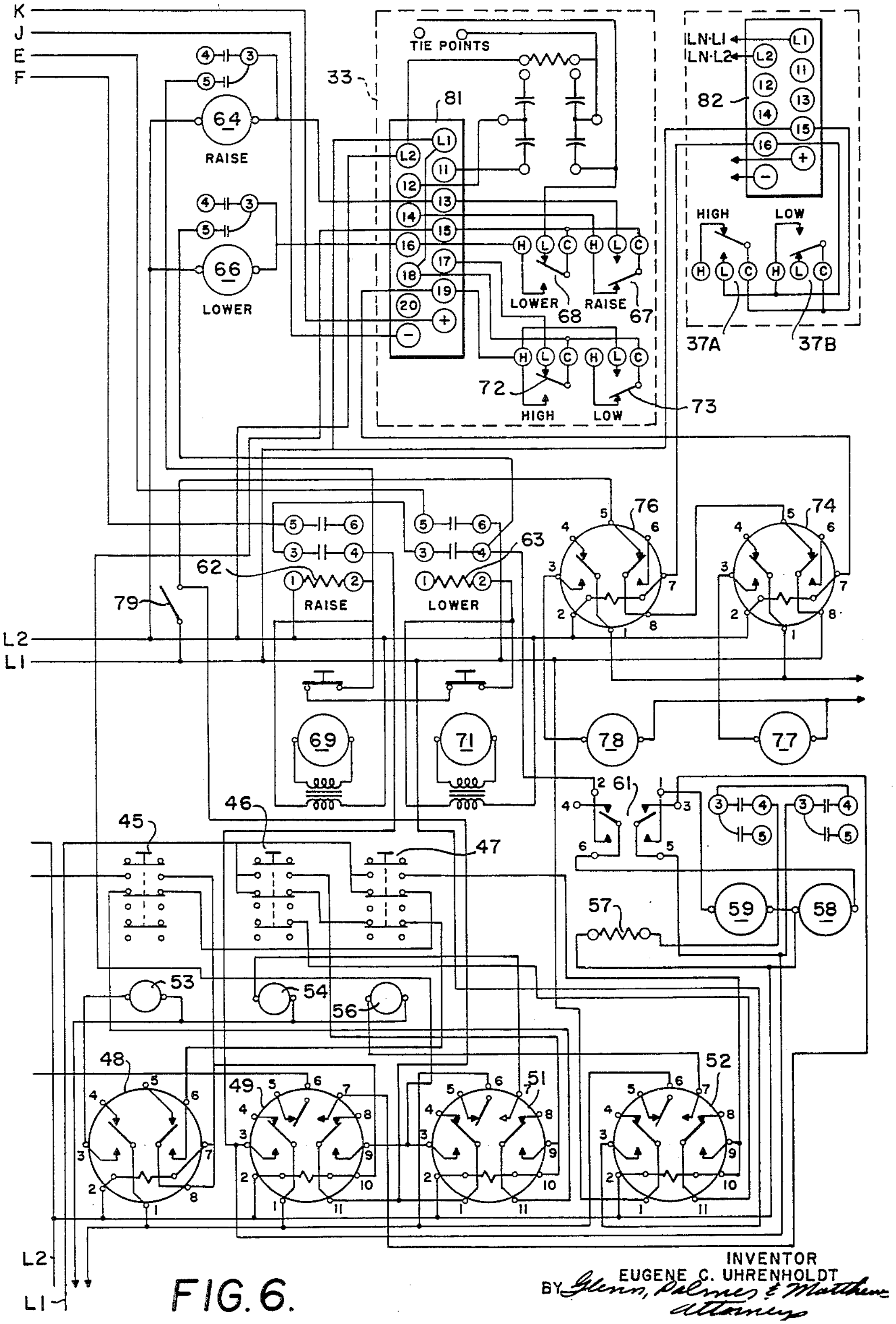
FIGURE 6 is an electrical schematic of a portion of the control circuit illustrating the controller or comparator and timing means shown in FIGURE 5 in greater detail.

Referring now to FIGURES 5 and 6, a scanning switch and controller circuit for a seventy pot system in accordance with the principles of this invention are shown in detail. As shown in FIGURE 5, the scanning switch 32 comprises three, twenty-five position, ten contact, impulse actuated stepping switches 32A–32C, each of which includes a stepping coil 32D–32E, respectively. The three switches 32A–32C are commercially available and are arranged to automatically step over seventy pots. Although the circuit discloses a seventy pot system, the circuit may be adapted to control fewer or more pots as required by substracting or adding scanning switches. Each stepping switch position 1–25 includes contacts A–K, wired as shown, so that ten circuits are switched at each position.

Each stepping switch 32A–32C is provided with double pole double throw interrupter contacts 37 which are connected to one side of a two position console disconnect switch 38 provided for each pot and by way of suitable terminal blocks 39. With the disconnect switch 38–1 in the ON position, as shown, the scanning switch 32A functions normally and scans each step. With the switch 38–1 in the OFF position, the scanning switch 32A rapidly steps across the pots or positions 1–70 where the respective switches are OFF or open.

Homing switches 41–1 through 41–70 and double pole double throw switches 42 are provided to operate homing relays 43 and 44 and cause the scanning switches 32–A, B and C, to rapidly step to the switched position or pot corresponding to the homing switch closed. Thus any pot (1–70) can be recalibrated at any time by opening the corresponding console disconnect switch 38 and closing the homing switch corresponding to that pot number.

Figure 8:
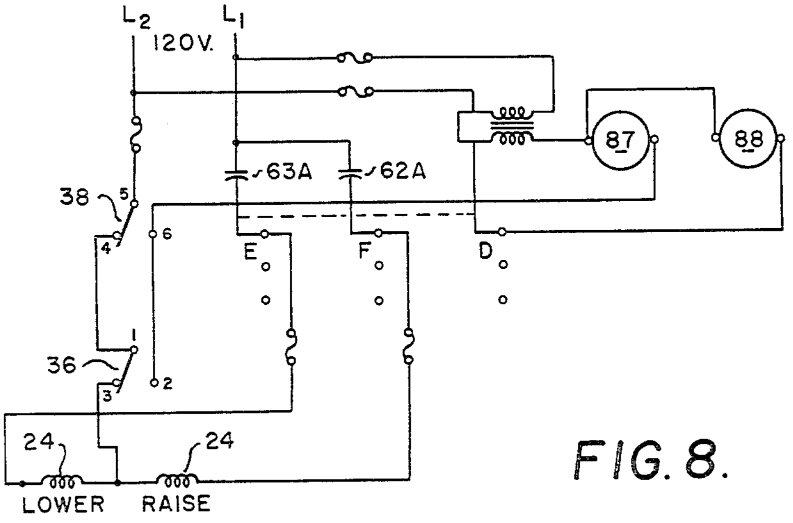
FIGURE 8 is an electrical schematic illustrating an anode raise and lower solenoid control circuit for an aluminum reduction pot.

Referring to FIGURE 6, the controller 33 includes a circuit for measuring $V_R$ and comparing it with $V_S$ (shown in detail in FIGURE 7) and suitable control circuitry for operating an anode raise-lower circuit shown in detail in FIGURE 8. Operational switches 45, 46, and 47, scan automatic relays 48, 49, No Scan Automatic Relay 51 and No Scan Manual Relay 52, permit automatic scan, or No Scan operation either automatically or manually. Signal lamps 53, 54 and 56 indicate the selected mode of operation.

During automatic scan operation, switch 45, actuated and signal lamp 53 on, coil actuated timer 57 is arbitrarily arranged to provide a .75 second time delay on each pulse of the scanning switch 32. The step-pulse duration may, of course, be varied. Timer motor 58 provides a three-second time delay at each switch step 1–70. Assuming no control action is effected at the end of three seconds, the scanning switch 32 is again pulsed and steps to the next position. If a control action is started and not completed within three seconds, timer motor 59 actuates switch 61 to repeat the contact duration until the control operation is completed. The timer motor 59 is arranged to provide a maximum time delay of 30 seconds before the scanning switch 32 steps to the next position.

Anode raise and lower control relays 62 and 63, respectively, are arranged to energize the solenoids 24 (FIGURE 8) when $V_R$ varies more than $+25$ mv. from the set point $V_S$ for more than .5 second as determined by timer motors 64 and 66 and raise and lower switches 67 and 68, respectively. Raise and lower signal lamps 69 and 71 indicate in which direction control action is effected. Switches 72 and 73 and voltage limit relay 74 are provided to lock out the controller 33 if $V_R$ varies greater than a determined value, for instance .2 volt, above the set point $V_S$. A current limit relay 76 operates current limit switches 77 and 78 if the line current is higher or lower, respectively, than the normal line current. In this instance, the relay 76 is arranged to operate either of the switches 37A and 37B (illustrated in FIGURE 4) if the line current varies 1000 amperes or more from normal line current. Voltage and current limit lamps 77 and 78 are turned ON when the relays 74 and 76 are operated. A limit by-pass switch 79 is also provided. Connections are made by way of suitable terminal blocks 81 and 82. The controller 33 is commercially available and an L–N SpeedoMax, Model R, manufactured by Leeds and Northrup Company, Philadelphia, Pa., performs the necessary comparison and control steps satisfactorily.

Figure 7:
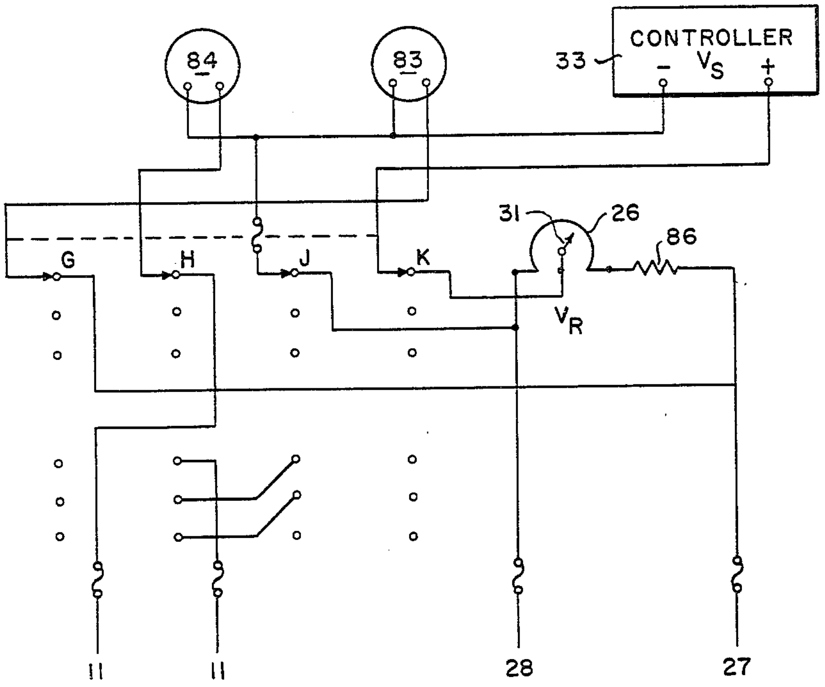
FIGURE 7 is an electrical schematic illustrating the reference voltage and standard voltage comparison circuit.

As shown in FIGURE 7 the variable resistor 26 is connected in series between the anode bus 11 and cathode bus 28 at each pot 1–N. This voltage across the variable resistor 26 is equal to the pot voltage $V_p$, which is the sum of the voltage drop $V_W$, the cathode voltage $V_C$ and anode voltage $V_A$ between the anode and cathode. A portion $V_R$ of the voltage $V_p$ is brought out via the center tap 31 and one terminal of the variable resistor and the cams 25 are arranged to continuously adjust the center tap 31 in accordance with a predetermined program of $V_A$ voltage variation, generated on the surface of the cam, whereby only variations in alumina concentration are reflected in $V_R$. The voltage $V_R$ is measured by a suitable voltmeter 83. A second voltmeter 84 measures the total voltage $V_p$ across each pot. All circuits are properly fused and a current limiting resistor 86 is connected in series with the variable resistor 26 until $V_R$ equals $V_S$ as indicated by the respective voltmeters.

As shown in FIGURE 8, the raise and lower solenoids 24 are connected across contacts E and F at each step position 1–70 and disconnect switches 36 and 38. All circuits are properly fused and Off and Point signal lamps 87 and 88 are provided to indicate the operation taken at each step position. The Raise Solenoid 24 is energized upon actuation of Raise relay 62 and closure of contacts 62A. Energization of Lower relay 63 closes contacts 63A to energize the Lower solenoid 24 to operate the valve 23 and lower the anode 12.

Although a preferred embodiment of the invention has been described in detail, it is apparent that various changes, modifications and alterations may be made without departing from the spirit and scope of the invention which is to be limited only by the appended claims.

What is claimed is:

1. The method of controlling the working voltage of each of a plurality of aluminum reduction pots during the flex-raise period of each pot, each pot having a relatively movable and spaced anode and cathode and at least one determinable variable associated therewith, and each pot having a working voltage responsive to variations in the spacing between the anode and cathode and to changes in the alumina concentration of the respective pot, comprising the steps of:
- producing a reference signal for each pot proportional to the total pot voltage of the respective pot;
- varying each reference signal during the flex-raise period of the respective pot in accordance with at least the said one determinable variable of the respective pot and independently of the variations in the alumina concentration of the respective pot to provide a resultant reference signal for each pot related to the variations in the alumina concentration of the respective pot;
- providing at least a single standard signal for comparison with each resultant reference signal;
- comparing each resultant reference signal of each pot with the standard signal; and
- adjusting the anode-cathode spacing in each respective pot in response to variations between the resultant reference signal of the respective pot and the standard signal to balance each resultant reference signal of each pot with said standard signal, thereby controlling the working voltage of each of said reduction pots.

2. The method of claim 1 wherein said anode is adjusted relative to said cathode in response to a variation, between the resultant reference signal of the respective pot and the standard signal, outside a determined control range.

3. The method of controlling the working voltage of an aluminum reduction pot during the flex-raise period, said pot having a relatively movable and spaced anode and cathode, a total pot voltage, a working voltage responsive to variations in the spacing between said anode and cathode and to variations in the alumina concentration in the pot, and said pot having at least one determinable variable associated therewith, comprising the steps of:
- producing a reference signal proportional to the total pot voltage of the pot;
- varying said reference signal during the flex-raise period in accordance with at least the one determinable variable and independently of said variations in the alumina concentration to provide a resultant reference signal related to the variations in the alumina concentration of the pot;
- providing a standard signal for comparison with the resultant reference signal;
- comparing the resultant reference signal with said standard signal, and;
- adjusting the anode-cathode spacing in said pot in response to variations between the resultant reference signal and the standard signal to balance the resultant reference signal with the standard signal, thereby controlling the working voltage of said reduction pot.

4. In an aluminum reduction pot for the electrolytic reduction of alumina having a spaced relatively movable anode and cathode between which an electrolyzing current is passed through a bath of molten electrolyte having an alumina concentration dissolved therein wherein a working voltage is developed, said working voltage including variable bath voltage losses related to variations in the bath alumina concentration, and at least one determinable variable for calibrating said working voltage comprising circuit means including:
- a variable impedance means in shunt across said anode and cathode for providing a variable reference signal proportional to the total pot voltage;
- program means for adjusting the variable impedance means to compensate for at least the one determinable variable;
- means for producing a standard signal; and
- means for comparing and balancing the reference signal with the standard signal.

5. In a system for maintaining a substantially constant working voltage between a spaced relatively movable anode and cathode of an aluminum reduction pot during the flex-raise period by varying the distance between said anode and cathode, said pot having a molten bath of electrolyte containing alumina dissolved therein, said working voltage including bath voltage losses related to variations in the bath alumina concentration, and at least one determinable variable, the improvement comprising circuit means including:
- variable impedance means in parallel with the anode-cathode current path for producing a reference voltage $V_R$ proportional to the total pot voltage of the pot;
- program means for adjusting the variable impedance means to compensate for the at least one determinable variable whereby said reference voltage $V_R$ varies from the working voltage in response to at least variations in the bath concentration;
- control means providing a standard voltage $V_S$;
- scanning means for periodically applying said voltage $V_R$ to said control means and for periodically comparing said reference voltage $V_R$ with said standard voltage $V_S$; and
- drive means responsive to variations between $V_R$ and $V_S$ for adjusting the anode-cathode spacing for effecting a control action thereby balancing the reference voltage and the standard voltage.

6. A system as defined in claim 5 wherein said control means includes for preventing said drive means from effecting said control action until $V_R$ varies from $V_S$ outside of a determined control range.

7. A system as defined in claim 5 including timer means for preventing said control action from being effected until $V_R$ varies from $V_S$ outside of a determined control range for a determined interval, thereby preventing adjustment of said anode relative to said cathode upon spurious variations of $V_R$ from $V_S$ outside of said control range.

8. A system as defined in claim 5 wherein said program means includes:
- a cam having a surface generated thereon corresponding to variations in the at least one determinable variable; and
- drive means for rotating said cam during said flex-raise cycle to vary said variable impedance means in accordance with said cam surface.

9. A system for controlling each of a plurality of aluminum reduction pots, each of said pots having a spaced and relatively movable anode and cathode in contact with a bath of molten electrolyte having alumina dissolved therein and between which an electrolyzing current is passed during a flex-raise cycle resulting in a total pot voltage drop $V_p$ across each of said pots and wherein each of said pot voltages includes at least one determinable variable and a working voltage $V_W$ that varies independently of the at least one determinable variable, comprising circuit means including:

variable impedance means for each pot connected to the anode and cathode of a respective pot for producing a reference voltage $V_R$ across each of said variable impedance means proportional to said total pot voltage of the respective pot;

program means for adjusting each said variable impedance means to vary each $V_R$ in response to at least the one determinable variable of the respective pot;

control means providing a standard voltage $V_S$;

scanning means for periodically applying each of the voltages $V_R$ to said control means and for periodically comparing each of said voltages $V_R$ with said standard voltage $V_S$; and drive means for each of said reduction pots responsive to variations between said reference voltages $V_R$ and said standard voltage $V_S$ for adjusting the spacing between said anode and said cathode of each of said respective pots to balance each of said respective voltages $V_R$ and $V_S$.

10. In a system for controlling each of a plurality of aluminum reduction pots by maintaining the working voltage $V_W$ of a respective pot substantially constant during the flex-raise period of the respective pot, the working voltage $V_W$ of each pot being the voltage drop across the spaced and relatively movable anode and cathode of the respective pot, and a total pot voltage $V_p$ across each of the pots resulting from passing an electrolyzing current through an alumina-bearing salt between the anode and the cathode of each pot, and in which the working voltage $V_W$ of a respective pot varies in accordance with at least changes in the alumina concentration of the respective pot during the said flex-raise period, and the total pot voltage $V_p$ includes a determinable and variable anode voltage $V_A$, said working voltage of each pot being maintained substantially constant by varying the spacing between said anode and cathode of the respective pot during electrolysis, the improvement comprising:

means for measuring the total pot voltage $V_p$ of each pot, said pot voltage $V_p$ including a determinable and variable voltage $V_A$ and said working voltage $V_W$;

circuit means including variable impedance means in parallel with the anode to cathode current path of the respective pot, each of said variable impedance means being adjustable to provide a reference voltage $V_R$ across the respective variable impedance means, each $V_R$ being proportional to its respective pot voltage $V_p$;

program means for adjusting each reference voltage $V_R$ during said flex-raise period in accordance with variations in the respective pot anode voltage $V_A$ and independently of variations in said alumina concentration and the respective working voltage $V_W$ of the respective pot;

control means including means for providing a standard voltage $V_S$;

scanning means for selecting and applying each of said voltages $V_R$ in seriation to said control means to compare said voltages $V_R$ with said standard voltage $V_S$; and drive means responsive to variations in said reference voltages and said standard voltage $V_S$ as determined by said control means for effecting a control action thereby varying the spacing between said anode and cathode of the respective pots to balance the respective reference voltage $V_R$ and said standard voltage $V_S$.

11. A system as defined in claim 10 wherein said reduction pots are connected in series with a suitable source of line current and said control means includes line current responsive means for disconnecting said control means when said line current is not within a determined range.

12. A system as claimed in claim 10 wherein said scanning means comprises:

a multi-position stepping switch, one stepping switch position for each reduction pot to be controlled;

said stepping switch including homing means for selectively advancing said stepping switch over said switch positions to a selected switch position as determined by said homing means.

13. A system as defined in claim 10, wherein said control means includes means for preventing said drive means from effecting said control action until $V_R$ varies outside of a determined control range.

14. A system as defined in claim 13 including timer means for preventing said control action from being effected until $V_R$ varies from $V_S$ outside of said control range for a determined interval, thereby preventing adjustment of said anode relative to said cathode upon spurious variations of $V_R$ outside of said control range.

15. A system as defined in claim 10 wherein said control means includes a first timing means for advancing said scanning means to the next succeeding reference voltage $V_R$ in the event that upon the selection of one of said reference voltages $V_R$ by said scanning means no control action is commenced by said drive means during an initial comparison interval as determined by said first timing means.

16. A system as defined in claim 15 wherein said control means includes second timing means for extending said initial comparison interval to a determined maximum comparison interval in the event a control action is commenced but not effected by said drive means during said initial comparison interval.

17. A system as defined in claim 16 wherein said second timing means includes further means for advancing said scanning means to the next succeeding reference voltage in the event that the control action is not effected during said maximum comparison interval.

18. A system as defined in claim 17 wherein said control means includes signal means for indicating when a control action is commenced but not effected during said maximum comparison interval; and switch means responsive to said condition for disconnecting said respective reduction pot from said control means.

19. A system as defined in claim 10 wherein said drive means comprises:

reversible motor means operatively connected to each anode for raising and lowering said anode relative to said cathode;

a source of power for said reversible motor means;

reversible means responsive to said control means for reversibly connecting said source of power to said reversible motor means, said reversing means including a switch for disconnecting said control means and said source of power from said reversible motor means; and manually operable means for reversibly connecting said source of power to said reversible motor means.

20. A system as defined in claim 19 including signal means for indicating the direction in which said reversible motor means adjusts said anode relative to said cathode.

21. The method of claim 1 including the step of:

calibrating each resultant reference signal of each pot with the standard signal prior to the step of comparing the resultant signal with the standard signal.

References Cited

UNITED STATES PATENTS

| | | | |
|---|---|---|---|
| 1,961,893 | 6/1934 | Wadman et al. | 204—245 XR |
| 2,545,412 | 3/1951 | Perret-Bit | 204—228 XR |
| 2,545,413 | 3/1951 | Perret-Bit | 204—228 XR |
| 2,904,490 | 9/1959 | Hanssen | 204—228 XR |
| 2,918,421 | 12/1959 | Lundborg | 204—228 XR |
| 3,294,656 | 12/1966 | Schmitt | 204—67 |

HOWARD S. WILLIAMS, Primary Examiner

D. R. VALENTINE, Assistant Examiner

U.S. Cl. X.R.

204—228, 245